United States Patent
Kim et al.

(10) Patent No.: US 11,256,321 B2
(45) Date of Patent: Feb. 22, 2022

(54) NETWORK-DRIVEN, PACKET CONTEXT-AWARE POWER MANAGEMENT FOR CLIENT-SERVER ARCHITECTURE

(71) Applicant: The Board of Trustees of the University of Illinois, Urbana, IL (US)

(72) Inventors: Nam Sung Kim, Champaign, IL (US); Mohammad Alian, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 31 days.

(21) Appl. No.: 16/024,290

(22) Filed: Jun. 29, 2018

(65) Prior Publication Data

US 2019/0004594 A1 Jan. 3, 2019

Related U.S. Application Data

(60) Provisional application No. 62/526,610, filed on Jun. 29, 2017.

(51) Int. Cl.
*G06F 1/3296* (2019.01)
*H04L 29/06* (2006.01)
(Continued)

(52) U.S. Cl.
CPC .......... *G06F 1/3296* (2013.01); *G06F 1/3209* (2013.01); *G06F 1/3287* (2013.01);
(Continued)

(58) Field of Classification Search
CPC ........ G08B 21/023; G05B 2219/25236; G06F 13/24; G06F 1/3209; G06F 1/3228; G06F 1/3296; G06F 1/3287
See application file for complete search history.

(56) References Cited

U.S. PATENT DOCUMENTS 7,747,694 B2 * 6/2010 McAllister .......... H04L 67/2857
709/206
8,984,309 B2 * 3/2015 Memon ................. G06F 1/3209
713/310

(Continued)

FOREIGN PATENT DOCUMENTS

WO WO 2016167915 A1 10/2016

OTHER PUBLICATIONS

Chang, X., Muppala, J. K. Han, Z. & Liu J., Analysis of interrupt coalescing schemes for receive-livelock problem in gigabit ethernet network hosts, 2008 IEEE International Conference on Communications, pp. 1835-1839 (Year: 2008).*

(Continued)

*Primary Examiner* — Jaweed A Abbaszadeh
*Assistant Examiner* — Hyun Soo Kim
(74) *Attorney, Agent, or Firm* — Leydig, Voit & Mayer, Ltd.

(57) ABSTRACT

A server system including an enhanced Network Interface Controller (NIC) within a client-server architecture is provided. The server system includes a memory for storing data from one or more network packets and one or more processors for processing network requests based on the one or more network packets. The enhanced NIC is configured to receive the one or more network packets and transfer the data from the one or more network packets to the memory. During a latency period defined from the time required to transfer the network packet to memory, the enhanced NIC performs a Network-driven, packet Context Aware Power (NCAP) management process in order to actively transition a power management state of the one or more processors to a predicted level. In this manner, computational and energy efficiency of the server system is improved.

16 Claims, 10 Drawing Sheets

(51) Int. Cl.
G06F 1/3287 (2019.01)
G06F 1/3209 (2019.01)
H04L 29/08 (2006.01)
G06F 1/3237 (2019.01)
G06F 1/324 (2019.01)

(52) U.S. Cl.
CPC ............ H04L 67/02 (2013.01); H04L 67/10 (2013.01); H04L 67/322 (2013.01); H04L 67/42 (2013.01); H04L 69/28 (2013.01); G06F 1/324 (2013.01); G06F 1/3237 (2013.01)

(56) References Cited

U.S. PATENT DOCUMENTS

| | | | |
|---|---|---|---|
| 9,104,406 B2 | 8/2015 | Dabagh et al. | |
| 9,383,798 B2 | 7/2016 | Wang et al. | |
| 2009/0063878 A1* | 3/2009 | Schmidt | G06F 1/3209 713/310 |
| 2011/0103259 A1* | 5/2011 | Aybay | H04L 45/306 370/254 |
| 2011/0213992 A1* | 9/2011 | Satsangi | G06F 1/3209 713/300 |
| 2014/0307562 A1* | 10/2014 | Bruckman | H04L 43/0835 370/241.1 |
| 2015/0373566 A1* | 12/2015 | Pius | H04W 24/08 370/252 |
| 2016/0381638 A1* | 12/2016 | Min | H04W 52/0235 370/311 |

OTHER PUBLICATIONS

Chagn, X., Muppala, J. K. Han, Z. & Liu J., Analysis of interrupt coalescing schemes for receive-livelock problem in gigabit ethernet network hosts, 2008 IEEE International Conference on Communications, pp. 1835-1839 (Year: 2008).*
Taylor IoT Kidd, C-states and P-states are very different, Jan. 1, 2015, [https://software.intel.com/en-us/blogs/2008/03/12/c-states-and-p-states-are-very-different?page=1] (Year: 2015).*
Power vs Performance, Jul. 15, 2016, [https://github.com/HewlettPackard/LinuxKI/wiki/Power-vs-Performance] (Year: 2016).*
Mohammad Alian, Ahmed H.M.O. Abulila, Lokesh Jindal, Daehoon Kim, Nam Sung Kim, NCAP:Network-Driven, Packet Context-Aware Power Management for Client-Server Architecture, 2017 IEEE International Symposium on High Performance Computer Architecture, 25-36 (Year: 2017).*
Alian et al. (Jan.-Jun. 2016) "pd-gem5: Simulation Infrastructure for Parallel/Distributed Computer Systems," IEEE Computer Architecture Letters 15(1): 41-44.
Alian et al. (Feb. 2017) "NCAP: Network-Driven, Packet Context-Aware Power Management for Client-Server Architecture," IEEE International Symposium on High Performance Computer Architecture, Austin TX: 25-36.
Atikoglu et al. (2012) "Workload Analysis of a Large-Scale Key-Value Store," SIGMETRICS Performance Evaluation Review 40(1): 53-64.
Barroso et al. (2013) "The Datacenter as a Computer: An Introduction to the Design of Warehouse-Scale Machines," Second Edition, Morgan & Claypool: 156 pp.
Bashir et al. (2009) "Fast Lock Scheme for Phase-Locked Loops," in IEEE Custom Integrated Circuits Conference (CICC), Rome, Italy: 319-322.
Benson et al. (2010) "Network Traffic Characteristics of Data Centers in the Wild," in SIGCOMM Conference on Internet Measurement (IMC), Melbourne, Australia: 267-280.
Binkert et al. (2011) "The gem5 Simulator," ACM SIGARCH Computer Architecture News 39(2): 1-7.
Brodowski (page generated Apr. 2017) "CPU Frequency and Voltage Scaling Code in the Linux Kernel," [Online] https://www.mjmwired.net/kernel/Documentation/cpu-freq/governors.txt. 4 pp.

Dawson-Haggerty et al. (2009) "Power Optimization—A Reality Check," Electrical Engineering and Computer Sciences University of California at Berkeley, Technical Report No. UCB/EECS-2009-140: 1-5.
Dean et al. (2013) "The Tail at Scale," Communications of the ACM 56(2): 74-80.
Delforge (Feb. 2015) "America's Data Centers Consuming and Wasting Growing Amounts of Energy: Critical Action Needed to Save Money and Cut Pollution," [Online] https/www.nrfdc.org/resources/Americas-data-centers-consuming-and-wasting-growing-amounts-energy. 4 pp.
Ferdman et al. (2012) "Clearing the Clouds: A Study of Emerging Scale-out Workloads on Modern Hardware," in International Conference on Architectural Support for Programming Languages and Operating Systems (ASPLOS), London, England: 37-47.
Flajslik et al. (2013) "Network Interface Design for Low Latency Request-Response Protocols," in USENIX Annual Technical Conference (ATC): 333-345.
Hsu et al. (2015) "Adrenaline: Pinpointing and Reining in Tail Queries with Quick Voltage Boosting," in IEEE International Symposium on High-Performance Computer Architecture (HPCA), Burlingame, CA: 271-282.
Intel (2007) "Interrupt Moderation Using Inter GbE Controllers," [Online] http://www.intel.my/content/dam/doc/application-note/gbe-controllers-interrupt-moderation-appl-note.pdf. 19 pp.
Intel (2009) "Voltage Regulator Module (VRM) and Enterprise Voltage Regulator-Down (EVRD) 11.1 Design Guidelines," [Online] http://www.intel.com/content/www/us/en/power-management/voltage-regulator-module-enterprise-voltage-regulator-down-11-1-guidelines.html. 62 pp.
Kasture et al. (2015) "Rubik: Fast Analytical Power Management for Latency-Critical Systems," in IEEE/ACM International Symposium on Microarchitecture (MICRO), Waikiki, HI: 598-610.
Larsen et al. (2009) "Architectural Breakdown of End-to-End Latency in a TCP/IP Network," International Journal of Parallel Programming 37(6): 556-571.
Li et al. (2009) "McPAT: An Integrated Power, Area, and Timing Modeling Framework for Multicore and Manycore Architectures," in IEEE/ACM International Symposium on Microarchitecture (MICRO), New York, NY: 469-480.
Liu et al. (2014) "SleepScale: Runtime Joint Speed Scaling and Sleep States Management for Power Efficient Data Centers," in ACM/IEEE International Symposium on Computer Architecture (ISCA), Minneapolis, MN: 12 pp.
Lo et al. (2014) "Towards Energy Proportionality for Large-Scale Latency-Critical Workloads," in ACM/IEEE International Symposium on Computer Architecture (ISCA), Minneapolis, MN: 12 pp.
Meisner et al. (2009) "PowerNap: Eliminating Server Idle Power," in International Conference on Architectural Support for Programming Languages and Operating Systems (ASPLOS), Washington, DC: 205-216.
Meisner et al. (2011) "Power Management of Online Data-Intensive Services," International Symposium on Computer Architecture (ISCA), San Jose, CA: 319-330.
Mochel (2005) "The sysfs Filesystem," in Linux Symposium, Ottawa, Ontario Canada: 313-326.
Pallipadi et al. (2007) "cpuidle—Do nothing, efficiently . . . ," in Linux Symposium, Ottawa, Ontario Canada: 119-126.
Pallipadi et al. (2006) "The ondemand Governor: Past, Present, and Future," in Linux Symposium, Ottawa, Ontario Canada: 215-230.
Rashti et al. (2007) "10-Gigabit iWARP Ethernet: Comparative Performance Analysis with InfiniBand and Myrinet-10G," in IEEE International Parallel and Distributed Processing Symposium (IPDPS), Rome, Italy: 8 pp.
Rossi et al. (2014) "Evaluating the Trade-off between DVFS Energy-Savings and Virtual Networks Performance," in Conference on Information-Centric Networking (ICN): 6pp.
Spiliopoulos et al. (2013) "Introducing DVFS-Management in a Full-System Simulator," in IEEE International Symposium on Modelling, Analysis and Stimulation of Computer and Telecommunication Systems (MASCOTS), San Francisco, CA: 11 pp.

(56) References Cited

OTHER PUBLICATIONS

Vamanan et al. (Dec. 2015) "TimeTrader: Exploiting Latency Tail to Save Datacenter Energy for Online Search," in International Symposium on Microarchitecture (MICRO), Waikiki, HI: 585-597.
Wamhoff et al. (2014) "The TURBO diaries: Application-controlled frequency scaling explained," in USENIX Annual Technical Conference (ATC), Philadelphia, PA: 193-204.
Zhang et al. (Jun. 2016) "Treadmill: Attributing the Source of Tail Latency through Precise Load Testing and Statistical Inference," in International Symposium on Computer Architecture (ISCA), Seoul, Republic of Korea: 456-468.

* cited by examiner

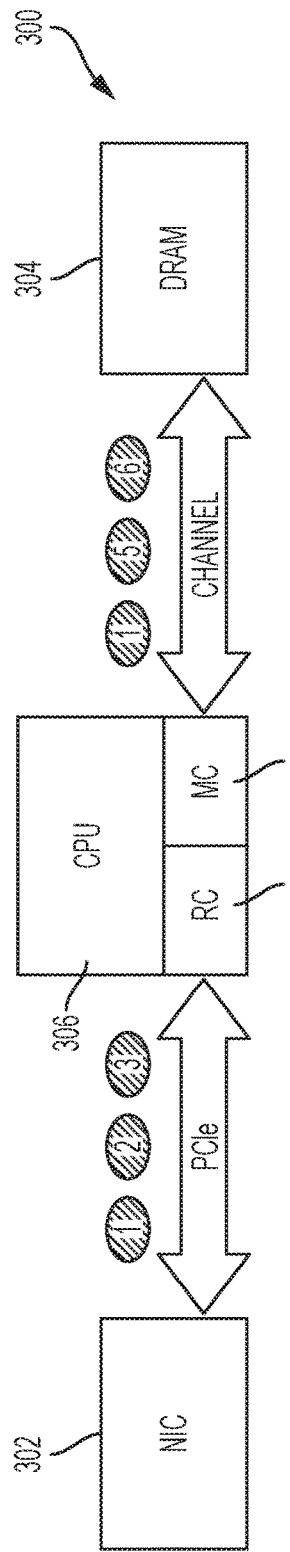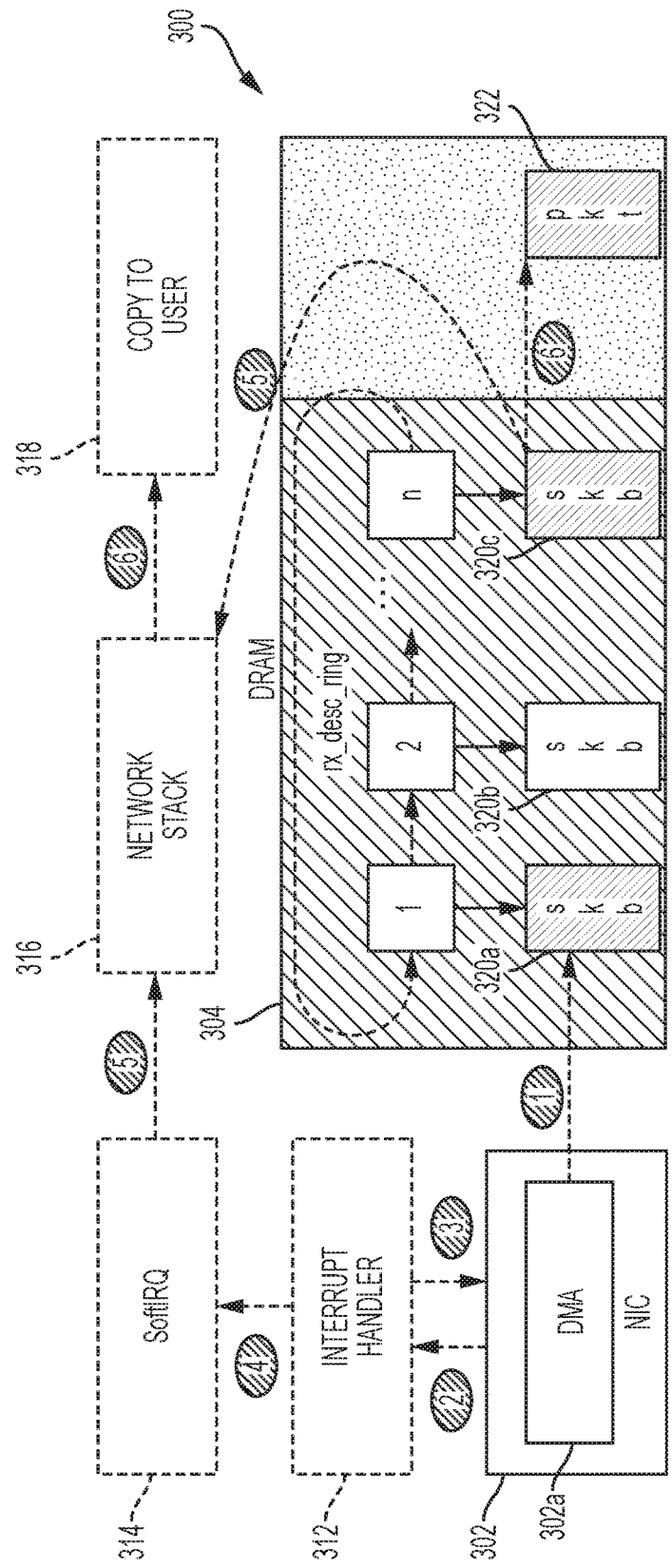

```
 1: @(MITT expirations)
 2: if ReqRate > RHT
  & level != FCONS then
 3: ICR |= IT_RX | ITHIGH
 4: post interrupt;
 5: level = FCONS
 6: elif [ReqRate < RLT
  & TxRate < TLT] for 1 ms
  & level > 0 then
 7: ICR |= IT_LOW
 8: post interrupt
 9: level --
10:fi
11:@(ReqCnt change)
12:if (CurrentTime - LastInterruptTime) > CIT
 & ReqCnt > 0 then
13: ICR |= IT_RX
14: post interrupt
15:fi
```

FIG. 5C

```
 1: if ICR & IT_HIGH then
 2: set_F(max);
 3: disable ondemand for 1 period
 4: disable menu governor
 5: elif ICR & IT_LOW then
 6: if F > min: then
 7: set_F(F - (max - min) / FCONS)
 8: disable ondemand for 1 period
 9: enable menu governor
10: fi
11:fi
```

FIG. 5D

NETWORK-DRIVEN, PACKET CONTEXT-AWARE POWER MANAGEMENT FOR CLIENT-SERVER ARCHITECTURE

CROSS-REFERENCE TO RELATED APPLICATIONS

This patent application claims the benefit of U.S. Provisional Patent Application No. 62/526,610, filed Jun. 29, 2017, which is incorporated by reference.

STATEMENT REGARDING FEDERALLY SPONSORED RESEARCH OR DEVELOPMENT

This invention was made with Government support under Grant Numbers CNS-1557244 and CNS-1600669 awarded by the National Science Foundation. The Government has certain rights in this invention.

BACKGROUND OF THE INVENTION

In a client-server architecture, when a server receives a request from a client, the server processes the request and sends back a response to the client. Certain types of requests require data intensive processing by the server. In particular, for On-Line Data-Intensive (OLDI) applications such as web search, servers need to reduce a high-percentile response time to satisfy a given Service Level Agreement (SLA). However, satisfying the SLA by providing target or better response times requires a large expenditure of energy by the server, which adds operating expenses. Accordingly, it is desirable to operate the server in an energy efficient manner.

In the server, the processor is the most power-consuming component, even in servers with many DRAM modules (DIMMs). For example, the processors in a two-socket server with 16 DIMMs consumes 42% of total server power. To maximize energy efficiency, therefore, servers implement a power management policy that exploits various performance and sleep states supported by many modern processors. Depending on the current performance demand, cores in a processor can operate at various performance states by increasing or decreasing their operational voltage/frequency (V/F) point. Moreover, idle cores in a processor can transition to various sleep states by turning off their clock, decreasing their voltage to a level that barely maintains their architectural states after turning off their clock, or turning off both their clock and power supply.

Transitioning a processor core from a sleep or low-performance state to a high-performance state, however, incurs a significant performance penalty. If we account for the overhead of system software layers associated with these transitions, the performance penalty is even higher. Such a notable performance penalty can substantially increase high percentile response time and discourages server operators from deploying an aggressive power management policy that frequently transitions processor cores to a low-performance or sleep state.

It is intuitive that the rate of network packets from clients can significantly affect the utilization, and thus performance and sleep states of processor cores in servers. For example, as a server suddenly receives many network packets containing latency-critical requests from clients, its processor cores need to operate at a high-performance state so that it can process the requests and send responses back within an acceptable time. However, if necessary processor cores have been in a sleep or low-performance state, the server needs to transition these processor cores to a high-performance state, which slows down the server response time. Conversely, if a server only occasionally receives a few network packets enclosing latency-critical requests from clients, it should transition unnecessary processor cores to a low-performance or sleep state in order to achieve acceptable energy efficiency.

BRIEF SUMMARY OF THE INVENTION

A particular embodiment of the disclosure provides a server system within a client-server architecture. The server system includes a memory for storing data from one or more network packets, one or more processors for processing network requests based on the one or more network packets, and a network interface controller. The network interface controller is configured to receive the one or more network packets and transfer the data from the one or more network packets to the memory. The network interface controller also performs a Network-driven, packet Context Aware Power (NCAP) management process during a latency period for the network interface controller to transfer the data from the one or more network packets to the memory.

Another embodiment of the disclosure provides a network interface controller of a server system within a client-server architecture. The network interface controller includes logic circuitry configured to receive one or more network packets and transfer data from the one or more network packets to a memory of the server system. The logic circuitry also performs a Network-driven, packet Context Aware Power (NCAP) management process during a latency period during transfer of the data from the one or more network packets to the memory.

Yet another embodiment of the disclosure provides a Network-driven, packet Context Aware Power (NCAP) management method for a server system within a client-server architecture. The method includes examining one or more network packets prior to data from the one or more network packets being stored in a memory of the server system; detecting one or more latency-critical requests within the one or more network packets based on the examination of the one or more network packets; speculating a completion time for one or more processors of the server system to complete the one or more latency critical requests; predicting an appropriate power state for the one or more processors based on the speculated completion time for the one or more latency critical requests; and transitioning a current power state of the one or more processors to the predicted appropriate power state.

BRIEF DESCRIPTION OF THE SEVERAL VIEWS OF THE DRAWINGS

FIGS. 3A-3B illustrate a server system, in accordance with a particular embodiment;

FIG. 5C illustrates pseudo code related to the enhanced NIC of FIG. 5A, in accordance with a particular embodiment of this disclosure;

FIG. 5D illustrates pseudo code related to an enhanced NIC driver of FIG. 5A, in accordance with a particular embodiment of this disclosure;

DETAILED DESCRIPTION OF THE INVENTION

Figure 1:
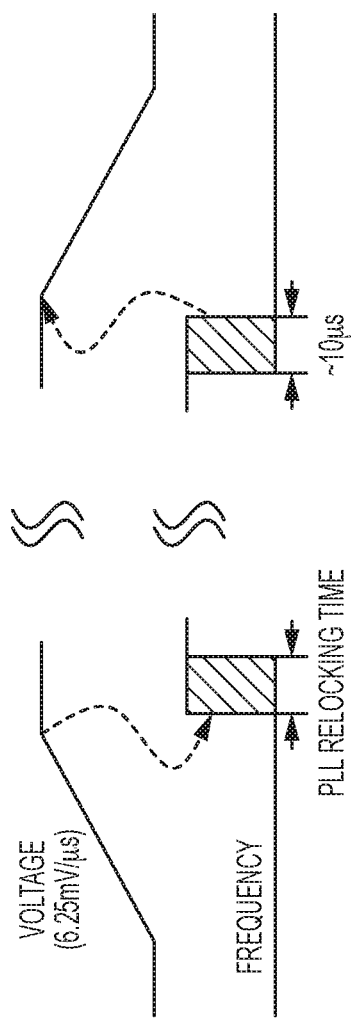
FIG. 1 illustrates typical processor V/F changes and an associated performance penalty due to Phase Lock Loop (PLL) relocking time, in accordance with a particular embodiment of the disclosure.

The present disclosure provides a Network-driven, packet Context-Aware Power (NCAP) management system for client-server architecture. The NCAP management system functions by actively managing the power states of various processor cores operating in a server in the client-server architecture.

In typical client-server architecture, a client device generates network request data that are encapsulated in network packets and transmitted to a server for reading the network packets and processing the client device's request. The server subsequently generates response data that is encapsulated into another network packet and transmitted to the client device. In certain embodiments, the network packets encapsulate On-Line Data-Intensive (OLDI) requests from applications such as web search. In these instances, servers need to reduce a high-percentile response time to satisfy a given Service Level Agreement (SLA).

Typically, in servers processing requests from OLDI application, the following three observations may be made: (1) A sudden increase or decrease in network packet rates is highly correlated with server utilization, and thus performance and sleep states of processor cores; (2) OLDI applications create network packets that contain latency-critical requests that are often encapsulated in the network packets in a predefined format; and (3) the latency to deliver received network packets from a Network Interface Controller (NIC) to the processor is notable in network hardware and software layers. Utilizing these three observations, the NCAP management system enhances the NIC and its associated driver to assist existing power management policies within the server to improve the energy efficiency of servers running OLDI applications without violating the SLA. More specifically, the enhanced NIC and its driver can detect network packets encapsulating latency-critical requests, speculates the start and completion of a request burst, and predicts the optimal performance and sleep states of processor cores to proactively transition processor cores from a sleep or low-performance state to a high-performance state.

A typical processor is operated in accordance with a particular power management protocol that is capable of configuring the processor into one of a variety of Performance (P) states or one of a variety of Sleep (C) states. In these processors, the power management protocol is interfaced with the Operating System (OS) of the server by an Advanced Configuration and Power Interface (ACPI) that enables the OS to set the various P or C states based on processor utilization within the server.

A P state of the processor represents various active performance states defined by an operational voltage level (V) and an operational frequency (F) of the processor. P states can range from P0 to Pn. Thereby representing a variable collection of states of V and F of the processor. In general, the deeper the P state, the lower the power consumption of the processor, which in turn lowers the performance of the processor. For instance, a processor core in P0 state operates at a highest V/F point that offers maximum sustainable performance under thermal and power constraints of the processor. P1, P2 and onward toward Pn lowers either one or both of the V or F to decrease power consumption of the processor.

Typical power management policies provide three static P-state management policies and one dynamic P-state management policy. These policies are controlled by system governors that act to alter the P state of the processor based on the particular policy. The static policy governors include performance, power-save, and user-space governors, and the dynamic policy governor includes an ondemand governor. Amongst these policies, the performance governor always operates cores at the P0 state, whereas the power-save governor always operates cores at the deepest P state (i.e., lowest V/F point). Lastly, among the static governors, the user-space governor enables a user to set the P state of a processor core. In contrast with the static governors, the dynamic ondemand governor periodically adjusts the P state based on the utilization of the processor's cores.

Figure 2:
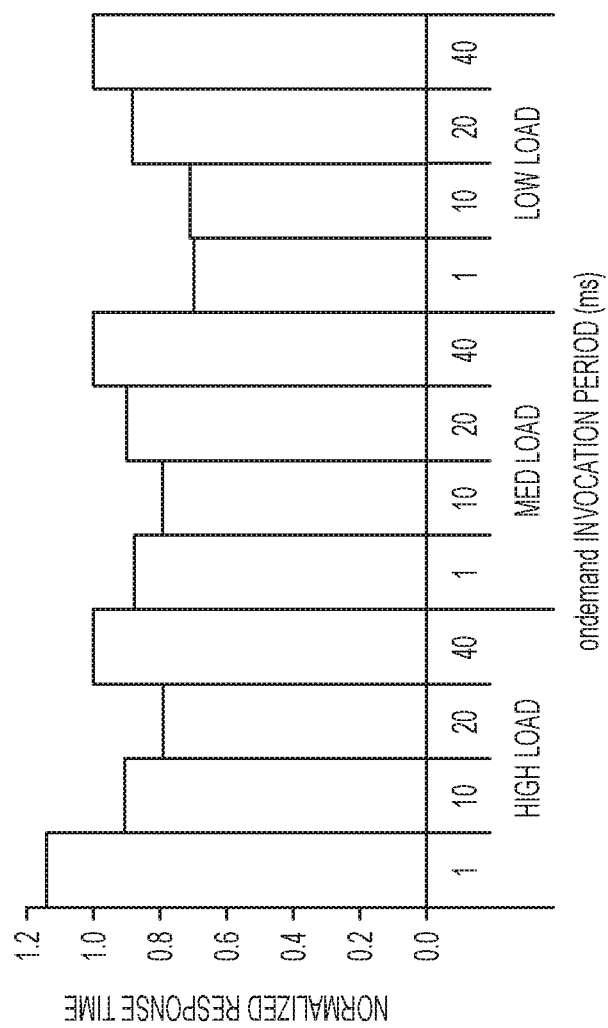
FIG. 2 illustrates a 95th percentile latency for various invocation periods of the ondemand governor of a server system running Apache, in accordance with a particular embodiment.

FIGS. 1 and 2 illustrate exemplary performance parameters of a processor of a server system while undergoing a change in its P state. FIG. 1 illustrates a typical sequence of changing the P state (i.e., V/F) of a typical processor core. In the illustrated embodiment, to increase V/F, V is ramped up to a target level at the rate of 6.25 mV/μs before the frequency is raised, as illustrated by the voltage reaching its target level prior to a start of the Phase Lock Loop (PLL) relocking time. Conversely, to decrease V/F, F is reduced before V is decreased, as shown by the approximately 10 μs relocking time of the PLL completing prior to the voltage being reduced. The example shown in FIG. 1 is only exemplary. In certain processors, for example, a transition from the lowest to highest V/F may take a much longer time (~50 μs) than a transition from the highest to lowest V/F (~5 μs), because of the latency of ramping up V before raising F. Additionally, while the processor core must halt for some time to allow for PLL relocking time, the illustrated 10 μs is just exemplary and may encompass a range of values, such as approximately 5 μs.

FIG. 2 illustrates a 95th-percentile latency of an exemplary server system at three load levels and for various periods of invoking the ondemand governor. As shown, the best invocation period varies under different load levels, and reducing the invocation period does not always improve the response time due to the performance penalty of frequently invoking the ondemand governor and changing V/F for the changing P state.

As briefly discussed above, if a processor is not currently in a performance or P state, then the processor core may be in one of a variety of states of sleep, called C states. Of particular note are the C0, C1, C3, and C6 states, which respectively denote idle, halt, sleep, and off states of a processor core. The deeper the C state, the lower the power consumption of that particular core, but at the expense of higher performance penalty due to longer wake-up latency when transitioning out of the sleep state.

Typical operating system kernels provide two C-state management policies, including a ladder governor and a menu governor. The ladder governor operates to first transition a processor core to the C1 state and then to a deeper C state if the sleep time increases past some threshold time. The menu governor records how long a processor core has been in a particular C state in the past and predicts how long it will stay in the C state in the future. The menu governor then chooses the most energy-efficient C state based on the prediction and associated wake-up penalty.

In certain embodiments, implementing the C state governors includes repeatedly checking whether a particular processor core receives a schedulable job. If there is any newly arrived job, a scheduler is invoked and the jobs are placed into a queue to be executed after being prioritized by the scheduler's policy. At this point, the processor core would be removed from its C state and placed into a particular P state. However, when no job is present in the queue, control is delegated to the C-state governor (e.g., menu governor) to reduce the power consumption of idle processor cores. The C-state governor is to apply a chosen C-state to a core based on its policy. For instance, in the C0 state, the processor core waits for a job dispatched to the queue. In this state, the processor core is awake and able to check whether it has an assigned job. In C states C1-C6, the processor cannot check whether or not there is a job to do. In these states, address monitoring hardware using a specified address region detects a store operation into the queue, the hardware transitions the processor core C state to a P state. This process typically incurs a performance penalty, such as a latency of operation of between 6-60p.

Besides the operational latency from switching P states or C states, additional system latency comes from typical network signaling. TCP/IP is the most widely used communications protocol for high-performance computing despite its overhead. Ethernet is a typical backbone of a datacenter network and is tightly coupled with TCP/IP layers. For instance, 10 Gb Ethernet has been already deployed in many datacenters and is shown to be effective in bridging a bandwidth gap between 1 Gb Ethernet and other counterpart systems, but latency issues still exist. A significant contributor to end-to-end TCP/IP packet latency are network software layers and multiple long-latency Peripheral Component Interconnect Express (PCI Express or PCIe) transactions to deliver a received packet from a NIC to a main system memory and processor.

FIGS. 3A and 3B illustrate a block diagram of a particular embodiment of a server system 300 showing the latency created via PCIe transactions (1), (2) and (3) and memory channel transactions (1), (5) and (6). FIG. 3A illustrates a higher level block diagram of the server system 300, and FIG. 3B illustrates a more detailed flow of the network packet from the NIC 302 to main system memory 304, which in the illustrated embodiment is shown as Dynamic Random Access Memory (DRAM) 304.

FIGS. 3A and 3B illustrate steps 1-6 of receiving a packet from a NIC 302 of the server system 300. At the higher level, FIG. 3A illustrates the NIC 302 communicating with the PCIe Root Complex (RC) 308 of a CPU or processor 306 of the server system 300. In certain embodiments, the PCIe RC 308 is contained on the processor 306 die and enjoys connectivity to a high-speed interconnect (not illustrated) also on the processor 306 die. This high-speed interconnect allows the PCIe RC 308 high speed interconnect with the Memory Controller (MC) 310 on the processor 306 die. The MC 310 communicates with the main system memory 304 via one or more memory channels. Accordingly, the NIC 302 is able to access the main memory 304 via the PCIe RC 308 and the MC 310 on the processor 306 die.

FIG. 3B illustrates the above described interconnectivity at a more granular level with respect to signaling created when a network packet is received at the NIC 302. The solid blocks of the NIC 302 and the DRAM 304 illustrate hardware components, while the dashed lines of the Interrupt Handler 312, the SoftIRQ 314, the Network Stack 316 and the Copy to User function 318 represent transactions performed on the processor 306.

At step 1, before receiving any network packet, a driver (not illustrated) of the NIC 302 creates a descriptor (or ring buffer shown as rx_desc_ring) in the main memory 304, which contains metadata associated with received packets, and initializes the descriptors to point to a receive kernel buffer (skb) 320a, 320b or 320c. Subsequently, the driver of the NIC 302 informs the NIC Direct Memory Access (DMA) engine 302a of the start address of rx_desc_ring. At step 2, when a packet is received, based on the descriptor information, the NIC 302 performs a DMA transfer to copy the packet to the associated skb 320a, 320b or 320c. At step 3, the NIC 302 generates a hardware interrupt to the processor 306. The interrupt handler 312 (running on the processor 306) examines the NIC 302 to determine the interrupt cause, which is done by reading a NIC register called Interrupt Cause Read (ICR) register through the PCIe bus. At step 4, after identifying the cause of the interrupt, the interrupt handler 312 queues the request from the received packet and schedules a Software Interrupt (SoftIRQ). At step 5, the SoftIRQ handler 314 passes the received packet's skb 320a, 320b or 320c to higher layers in a network stack 316 and reallocates another skb 320a, 320b or 320c for the used descriptor. At step 6, the packet will be passed to a Copy to User function 318 to be copied into a user space buffer (pkt) 322 after it is processed by the software layers in the network stack 316.

The above described latencies generated from switching P or C states of a processor and those generated from PCIe and memory channel transactions combine in a manner that exacerbates latency issues in the overall server system 300. Namely, a correlation between network activity and processor power management exists. In many cases, network packets received by a server, such as server system 300, contain requests to be processed by processor cores. Thus, as a server receives more network packets, processor utilization will increase. For example, suppose a client sends a Hypertext Transfer Protocol (HTTP) request to an OLDI application server. As HTTP requests are encapsulated in TCP packets, the request should go through the server network layers, as described above with relation to FIG. 3, before a processor core in the server can start to process the request. Subsequently, the application will decode the request, bring the requested values from the main memory and send them to the client through one or more TCP packets. Executing the key OLDI processing code and network software layers (for both receiving requests and transmitting responses) increases the processor utilization, when the server receives a burst of requests. Accordingly, because P and C states are determined by the utilization of the processor cores (e.g. if core utilization is high then the ondemand governor will transition to P0 and the menu governor will keep the core in C0), there is a correlation between network activity and the processor power management of a server.

Moreover, the rate of network packets received by a server system is inherently unpredictable, particularly so at the low-to medium-levels of request rates. That is, the network packet rate can suddenly increase and decrease after it stays at a low level for a long period. As discussed above, latency is created when a server transitions processor cores from a deep C or P state to the P0 state (highest operational V/F point), which delays when received requests may be processed. This increases high-percentile response time for subsequent bursts of network requests, and thus may entail SLA violations. Consequently, server operators may deploy the performance governor in a manner that always operates processor cores at the P0 state, wasting energy at low-to medium-load levels.

NCAP management takes advantage of the correlation between network activity and processor power management. Specifically, NCAP management utilizes the latency created from the PCIe and memory channel transactions, described in relation to FIG. 3, to perform active power management of P and C states of a processor in a server system.

Figure 4:
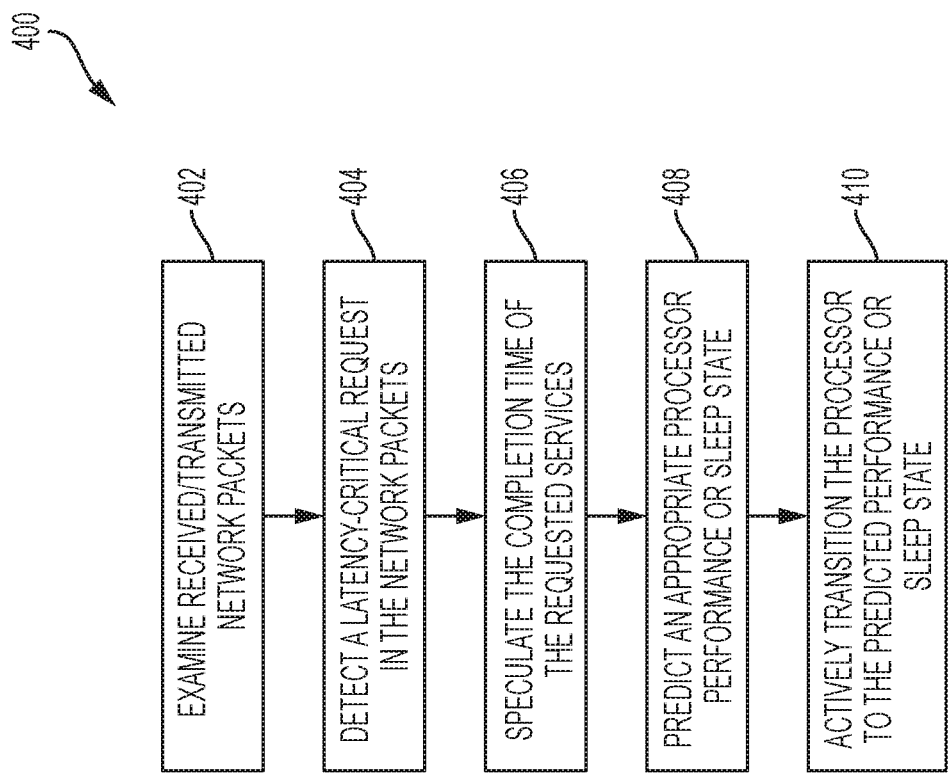
FIG. 4 illustrates a Network-driven, packet Context Aware Power (NCAP) management process, in accordance with an exemplary embodiment of this disclosure.

FIG. 4 illustrates a flow chart 400 showing high level steps performed by server systems employing NCAP management. The following description of flow chart 400 is made in reference to an embodiment of the server system 300 (see FIG. 3) with an enhanced NIC 302 utilizing NCAP management. This is not meant to be limiting, as any client-server architecture is contemplated as use NCAP management.

At step 402, the enhanced NIC 302 (see FIG. 3) examines a received/transmitted network packet. This examination is made to determine whether the network packet includes a latency-critical request, such as those directed to an OLDI application server. At step 404, a burst of latency-critical network packets are detected based on the examination in step 402. At step 406, the enhanced NIC 302 speculates a time for the processor 306 to complete the services requested in the latency-critical network packet(s). Utilizing the speculated completion time, the enhanced NIC 302 predicts an appropriate performance or sleep state of the processor 306. Finally, at step 410, the enhanced NIC driver 302 actively transitions the processor 306 to the predicted performance or sleep state.

In this manner, the enhanced NIC 302 employs NCAP management to efficiently control a power state of the processor 306 to reduce system latency and prevent delays in processing network requests. In particular, the above described steps of NCAP management overlap a large fraction of a notable performance penalty of transitioning processor cores to a high-performance state with a long latency of transferring received network packets from the enhanced NIC 302 to the main memory 304. Consequently, NCAP management allows server operators to deploy an aggressive power management policy without notably increasing the high-percentile response time.

As an aside, in certain embodiments, NCAP management does not only respond to a high rate of any network packets (e.g., network packets associated with virtual machine migrations and storage server operations), as it selectively considers latency-critical network packets. In alternative embodiments, NCAP management could also be applied to respond to a high rate of any network packets, regardless of whether the network packet is making a latency-critical request.

FIGS. 5A-5D illustrate an enhanced NIC and its various operational aspects, in accordance with a particular embodiment. Specifically, as illustrated, NCAP management aims to assist the ondemand governor and the menu governor and leverage a low-level network packet context to actively transition processor cores to an appropriate P state or C state.

Figure 5A:
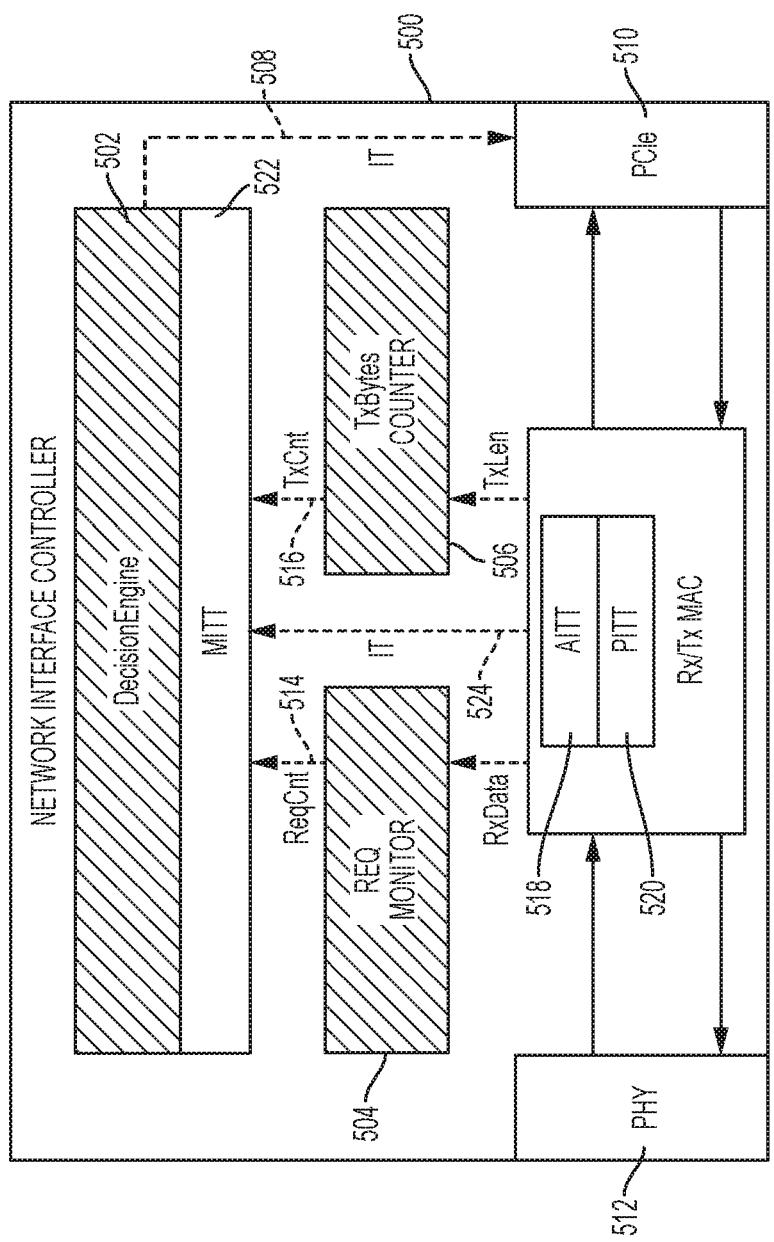
FIG. 5A illustrates a block diagram of an enhanced NIC, in accordance with a particular embodiment of this disclosure.

FIG. 5A illustrates a block diagram of an enhanced NIC 500 including logic circuitry to perform NCAP management. The enhanced NIC 500 will be described in the context of the NIC 302 (see FIG. 3) of server system 300. However, this disclosure contemplates other server system architectures besides the architecture shown in FIG. 3.

In the illustrated embodiment, the logic circuitry of the enhanced NIC 500 includes three primary elements. These elements are a Decision Engine 502, a ReqMonitor Counter 504 and a TxBytes Counter 506. The Decision Engine 502 is configured to trigger a special interrupt 508 used to alter an operational state of a processor, such as processor 306 (see FIG. 3), of the server system 300. In the illustrated embodiment, this special interrupt 508 is sent to the processor 306 via the PCIe 510. The ReqMonitor Counter 504 and a TxBytes Counter 506 observe received and transmitted network packets, respectively, from the physical interface (PHY) 512.

The ReqMonitor Counter 504 counts received network packets in the form of ReqCnt 514, and the TxBytes Counter counts transmitted network packets in the form of TxCnt 516. Accordingly, by observing the ReqCnt 514 and the TxCnt, the enhanced NIC 500 is able to detect a significant increase in a rate of received network packets (encapsulating latency-critical requests) and a decrease in a rate of transmitted network packets. If this condition is detected, the Decision Engine 502 triggers the special interrupt 508 that is then sent to the processor 306 over the PCIe 510. Upon receiving the special interrupt 508, the processor 306 (see FIG. 3), utilizing the Interrupt Handler 312, actively transitions necessary processor cores to the P0 state (i.e., the highest performance state), if the processor cores have been in low performance or sleep state.

Furthermore, if a network packet with a latency-critical request is received at the enhanced NIC 500 and the Decision Engine 502 observes a long interval between the past interrupts and current time, the Decision Engine 502 speculates that the processor cores are in C states and immediately generates the special interrupt 508 to proactively transition these processor cores to a higher-performance state, such as the C0 (active state). The immediate C and P state changes for such events allow the server system 300 deploying NCAP management to quickly service a large number of requests abruptly sent from clients while consuming lower energy than a server system adopting the default ondemand and menu governors.

Figure 5B:
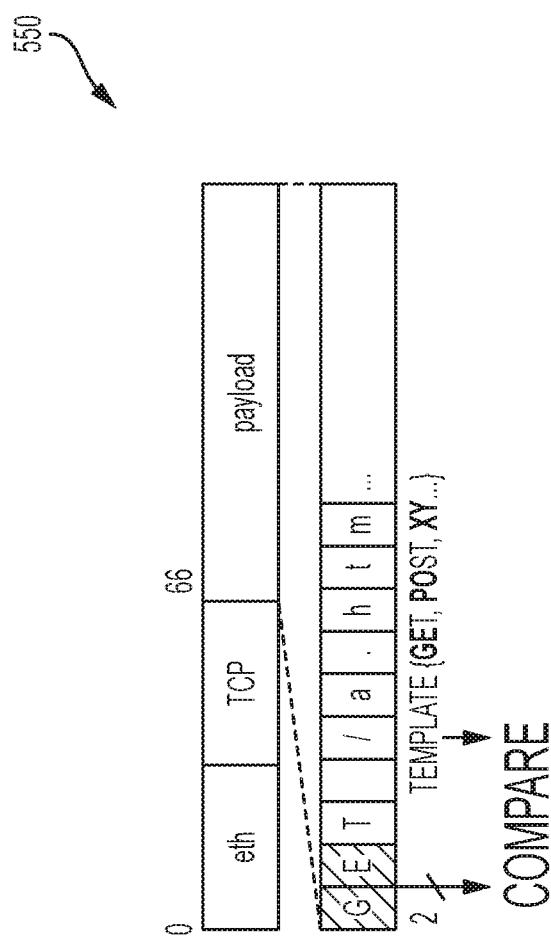
FIG. 5B illustrates a data structure of a network packet, in accordance with a particular embodiment of this disclosure.

The enhanced NIC 500 is able to determine whether a received or transmitted network packet contains a latency-critical request based on a data structure 550, illustrated in FIG. 5B. Data structure 550 shows a latency-critical network packet generated based on an OLDI application. Typically, the data structure 550 includes a predefined format that follows a standardized universal protocol. For instance, HTTP is a unified application protocol that is widely used for OLDI applications. An HTTP request starts with a request type (e.g., GET, HEAD, POST, or PUT) which is followed by a requested URL, and other request header fields. To actively transition processor cores from a deep C or P state to the P0 state, instead of using the received packet rate as a hint, NCAP management exploits the fact that latency-critical requests of OLDI applications often have this predefined format.

To detect latency-critical requests, ReqMonitor Counter 504 (see FIG. 5A) compares the first two bytes of the payload of the data structure 550 with a set of templates that are stored in one or more registers in the enhanced NIC 500. In a particular embodiment, these registers are programmed to store latency-critical request types, such as GET, when running the initialization subroutine of the NIC driver of the enhanced NIC 500. Consequently, ReqMonitor Counter 504 examines the received network packets to determine whether or not one or more of the received network packets is a latency-critical packet based on comparing the first two bytes of the payload data of data structure 550 against stored template data. If the payload data indicates the received network packet is latency critical, then the ReqMonitor Counter 504 increments the ReqCnt 514, which is provided to the Decision Engine 502. In this manner, the ReqMonitor Counter 504 examines received network packets and detects whether those packets contain latency-critical requests.

With respect to transmission of network packets from the server system 300 (see FIG. 3) utilizing the enhanced NIC 500, the TxBytes Counter 506 performs a similar function as the ReqMonitor Counter 504. Specifically, once processing of the requests from the OLDI application is complete, network packets containing the response to the requests are generated and transmitted to the OLDI application from the server system 300. These network packets typically include latency critical data. Accordingly, the processor 306 should not transition out of the P0 state before completion of the transmission of these latency critical network packets. Accordingly, TxBytes Counter 506 counts bytes of transmitted data and generates TxCnt 516 to track whether the latency critical network packets have completed transmission. Decision Engine 502 then utilizes TxCnt 516 to prevent the processor 306 from transitioning to a different P state or C state until the latency critical network packets complete transmission.

Accordingly, by observing both the ReqCnt 514 and the TxCnt 516, the Decision Engine 502 is able to speculate a completion time for the processor 306 to handle each latency-critical request and predict an appropriate processor performance or sleep state. In certain embodiments, even if the packets to be transmitted are not latency-critical, the Decision Engine 502 will operate the processor 306 at the P0 state to complete the packet transmission faster and thus allow the processor cores to transition to a C state sooner.

Returning to FIG. 5A, in the illustrated embodiment, the enhanced NIC 500 further includes a set of Interrupt Throttling Timers (ITTs). The ITTs function to moderate a number of interrupts generated by the enhanced NIC 500. In the illustrated embodiment, the enhanced NIC 500 includes five ITTs to moderate the interrupt rate: two Absolute Interrupt Throttling Timers (AITTs) 518 (illustrated as a single AITT block); two Packet Interrupt Throttling Timers (PITTs) 520 (illustrated as a single PITT block); and one Master Interrupt Throttling Timer (MITT) 522.

The AITT 518 and the PITT 520 are triggered by a network event (i.e., whenever a packet is received or transmitted) to limit the maximum number of interrupts posted upon receiving or transmitting packets via interrupt IT 524. In contrast, the MITT 522 operates independently from any interrupt source or network event, and constrains the total interrupt rate of the enhanced NIC 500. In this manner, the MITT 522 posts an interrupt to the processor 306 (see FIG. 3) when the MITT 522 expires.

Before posting an interrupt to the processor 306 (see FIG. 3), the enhanced NIC 500 sets an ICR with the type of interrupt that it intends to send to the processor from a set of interrupt types predefined by a device driver of the enhanced NIC 500 (e.g., IT_RX when a received packet is ready to be passed to the network software layers). The ICR typically contains unused bits, which NCAP management uses to create two additional interrupt types used to transition a processor core from a deep C or P state to the P0 state at appropriate moments. In an exemplary embodiment, these two interrupt types are IT_HIGH and IT_LOW.

FIG. 5C illustrates pseudo code showing operation of the Decision Engine 502 (see FIG. 5A) using the two additional interrupt types, IT_HIGH and IT_LOW. As shown, two events trigger Decision Engine 502: (1) MITT 522 expirations and (2) ReqCnt 514 changes. When the MITT 522 expires, a new request rate (ReqRate) is determined by ReqCnt 514. If ReqRate is greater than a request rate high threshold (RHT) and a processor operational frequency (F) is not already set to the maximum (P0 state), then the Decision Engine 502 posts an interrupt to the processor 306 (see FIG. 3) after setting IT_HIGH and IT_RX bits of the ICR. Alternatively, if ReqRate and TxRate are smaller than a request rate low threshold (RLT) and a transmission rate low threshold (TLT), respectively, for a period of time (1 ms in the illustrated embodiment), Decision Engine 502 posts an interrupt to the processor 306 after setting the IT_LOW bit of the ICR.

When an interrupt with IT_HIGH and IT_RX is posted, NCAP management performs a sequence of actions as follows: (1) increasing F to the maximum frequency; (2) disabling the menu governor; and (3) disabling the ondemand governor for one invocation period. The menu governor is disabled to prevent short transitions to a C state during a surge period of receiving latency critical network requests. NCAP management also disables the ondemand governor for one invocation period to prevent any conflict between NCAP management and ondemand governor decisions.

In certain embodiments, while NCAP management sets F to a maximum value upon an assertion of IT_HIGH, it can be more conservative in decreasing F (i.e., reducing F to the minimum over several steps) when an IT_LOW is posted. It accomplishes this step-wise decrease in processor operational frequency by utilizing an FCONS parameter. FCONS is a parameter to determine a number of steps to reach the minimum F. That is, the number of required back-to-back interrupts with IT_LOW to reduce F to the minimum. NCAP management enables the menu governor when the first IT_LOW interrupt is posted.

As further shown in FIG. 5C, a change in ReqCnt 514 (see FIG. 5A) infers that new requests have been received by the enhanced NIC 500. If a time interval between a current request and a last interrupt posted to the processor 306 (see FIG. 3), as shown by Current Time−LastinterruptTime being larger than a processor idle time threshold (CIT), which is typically set by the user or menu governor, Decision Engine 502 (see FIG. 5A) posts an interrupt with IT_RX to the processor 306 (see FIG. 3). When the processor 306 has not been interrupted for a long time, NCAP management speculates that processor cores have been in an idle state for a while, and thus transitioned to a C state. In such an event, NCAP management immediately sends an interrupt to the processor 306 so that the target processor core to process the request(s) can transition from the C state to active state and gets ready to service the requests. In this manner, processing efficiency is increased within server-client architecture.

FIG. 5D illustrates pseudo code describing operation of interrupt handler 310 (see FIG. 3) associated with the enhanced NIC 500 (see FIG. 5A). As shown, when an interrupt is received from the enhanced NIC 500, if the IT_HIGH bit of ICR is set, then the NIC hardware interrupt handler 310 (see FIG. 3) changes F to the maximum value and disables the ondemand governor and the menu governor. Otherwise, if the IT_LOW bit is set, then the NIC hardware interrupt handler 310 determines the next F based on FCONS, disables the ondemand governor and enables the menu governor.

Figure 6:
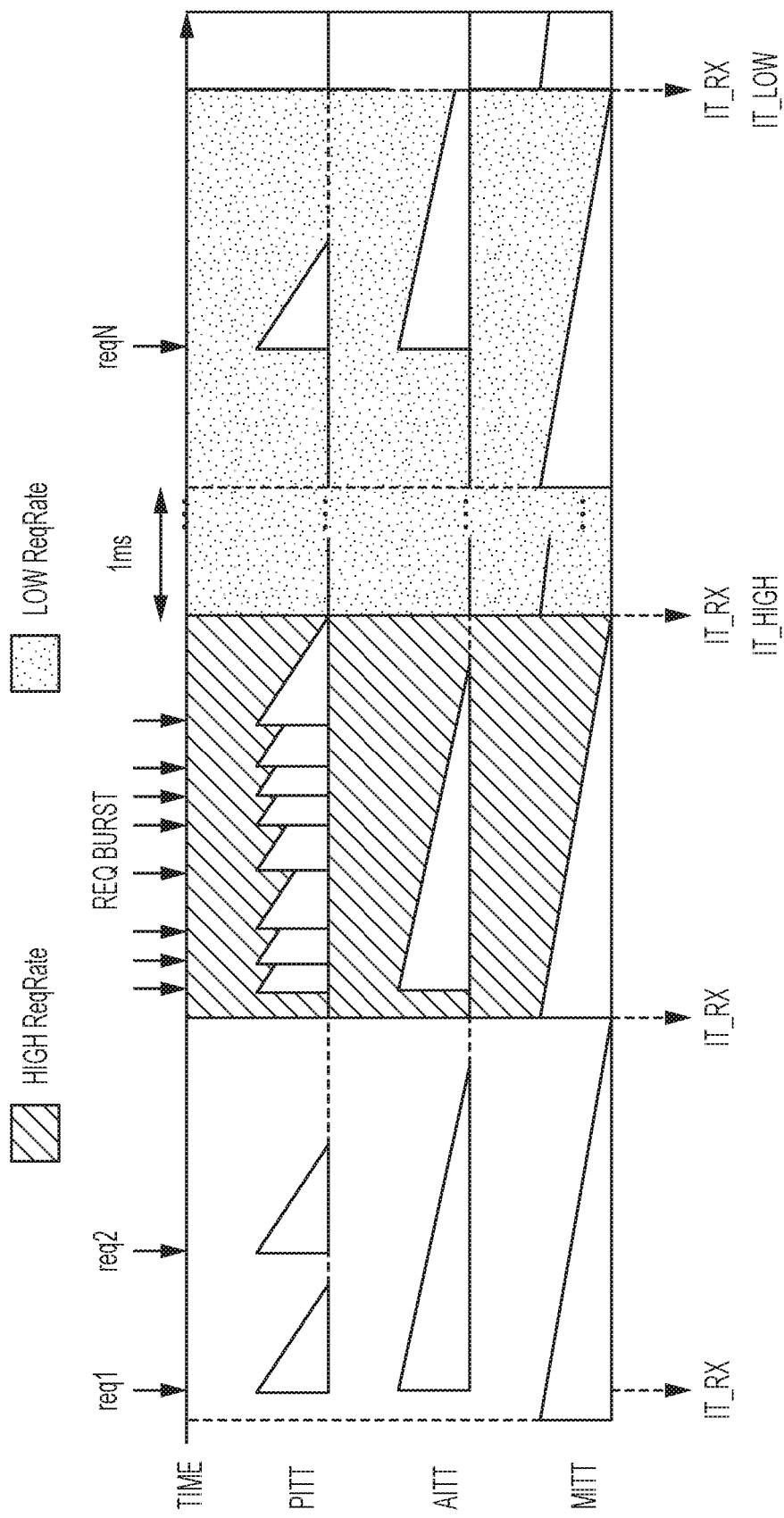
FIG. 6 illustrates interrupt throttling timers of the enhanced MC of FIG. 5A, in accordance with a particular embodiment of this disclosure.

FIG. 6 illustrates the AITT 518, PITT 520 and MITT 522 (see FIG. 5A) of the enhanced NIC 500 utilizing NCAP management under certain packet arrival scenarios, from left to right in FIG. 6. In the first scenario, req1 is received after the enhanced NIC 500 has been in a long idle period (longer than CIT). In this case, the Decision Engine 502 immediately sends an interrupt with IT_RX to transition a processor core to a P state regardless of the MITT expiration time.

Moving to the right in FIG. 6, in the second scenario, when a burst of requests is received and the MITT expires, ReqRate (see FIG. 5C) is updated. This triggers the Decision Engine 502 to send an interrupt with IT_HIGH to change F to the maximum and disable the menu governor.

Moving again to the right in FIG. 6, in the third scenario, after detecting a low-activity period (1 ms in the illustrated embodiment), Decision Engine 502 sends one or several interrupts with IT_LOW to decrease F and enable the menu governor again. The Decision Engine 502 will send one IT_LOW that decreases F to a minimum level if implementing an aggressive policy, and will send multiple IT_LOW interrupts if the policy is conservative. When the NCAP management policy is conservative, the number of IT_LOW interrupts that are required to reach a minimum F is determined based on FCONS (see FIG. 5C).

Figure 7:
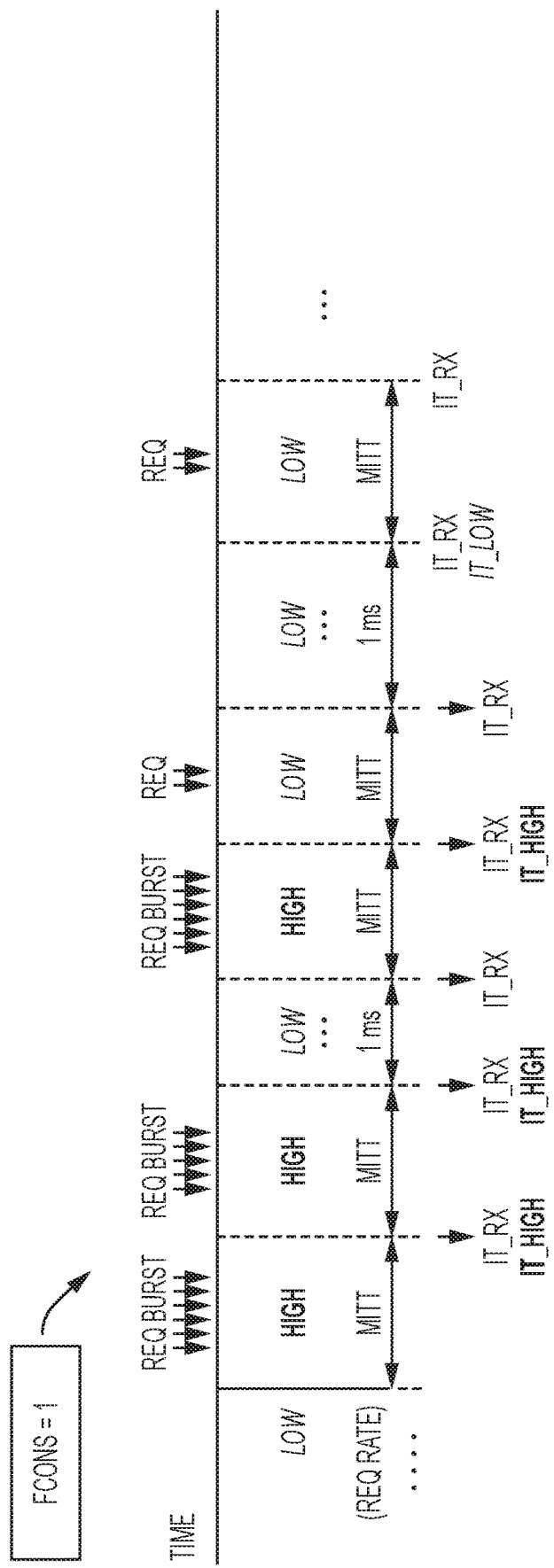
FIG. 7 illustrates interrupt throttling timers of the enhanced MC of FIG. 5A, in accordance with a particular embodiment of this disclosure.

FIG. 7 illustrates an interrupt timing diagram for NCAP management using an aggressive policy with an FCONS=1. This scenario starts at the left at the low ReqRate (see FIG. 5C) level. Moving one period to the right, multiple requests are received, which triggers the Decision Engine 502 to issue both IT_RX and IT_HIGH. The same high activity level is maintained for another period of MITT, which again prompts the Decision Engine 502 to issue both IT_RX and IT_HIGH. Moving to the right, shows no activity for a 1 ms period, which prompts the Decision Engine 502 to only issue IT_RX, but the period immediately afterwards shows high activity again and prompts both IT_RX and IT_HIGH. In the next period, the activity is low again for one period of MITT 522, which prompts another IT_RX from the Decision Engine 502. In the subsequent period, a 1 ms low period is detected, which prompts the Decision Engine 502 to issue the IT_LOW. Because this is an embodiment illustrating an aggressive policy with FCONS=1, the processor frequency F is decreased to the minimum level after only IT_LOW. In the subsequent period, new requests are received, but at a low level, which prompts the Decision Engine 502 to issue IT_RX to inform the processor core of the arrival of new requests.

Figure 8:
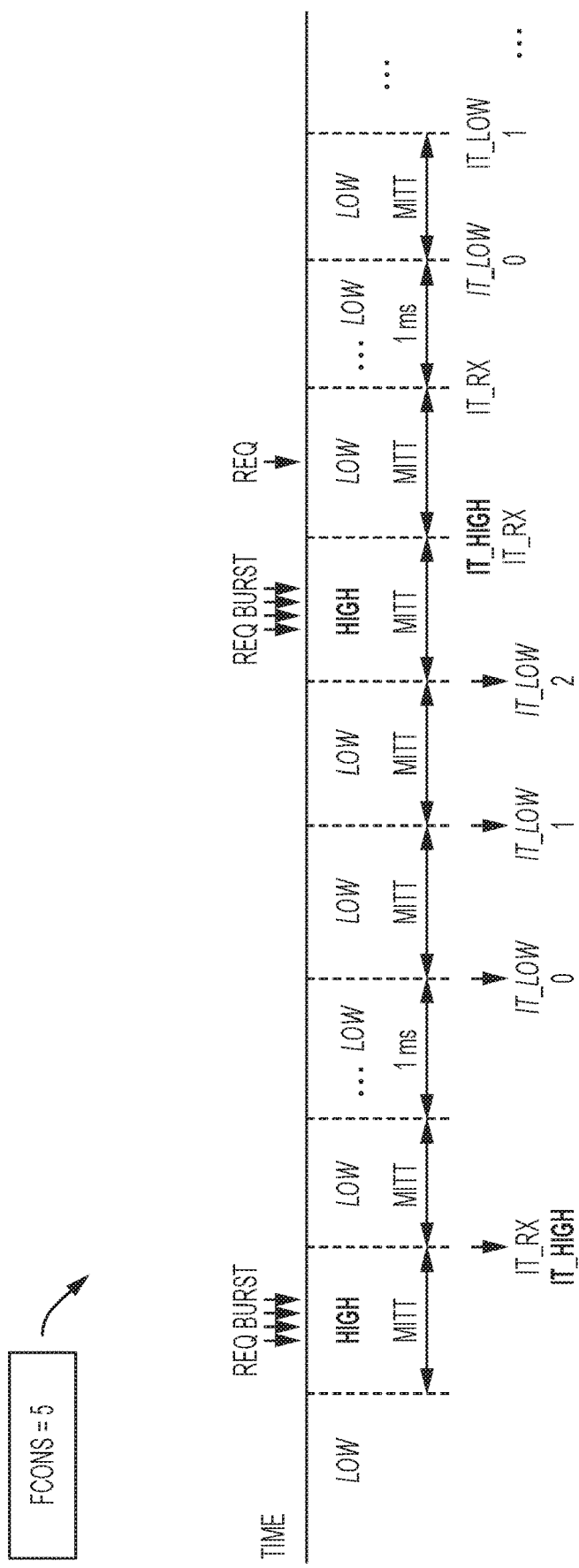
FIG. 8 illustrates interrupt throttling timers of the enhanced MC of FIG. 5A, in accordance with a particular embodiment of this disclosure.

FIG. 8 illustrates an interrupt timing diagram for NCAP management using a conservative policy with an FCONS=5 (see FIG. 5C). The illustrated scenario begins in the low state. During the subsequent MITT 522 (see FIG. 5A), several requests are received, which prompts the Decision Engine 502 to issue IT_RX and IT_HIGH. The next MITT 522 period receives no requests, followed by 1 ms period with no further requests, which prompts a first IT_LOW to be issued by the Decision Engine 502. In the illustrated embodiment, because FCONS=5, the F of the target processor core is not automatically decreased to the minimum level, but rather would take five consecutive IT_LOWs before reaching that level. As shown, three consecutive IT_LOWs are issued before several additional requests are received. As such, when the additional requests are received, the target processor core is not at the minimum F and can be brought back to the maximum F quicker than if it was operating in the minimum F. To bring the F back up to maximum, the Decision Engine 502 issues IT_RX and IT_HIGH. Subsequently, the network activity decreases, which starts the process of repeatedly sending IT_LOW (at most five times) before reaching a minimum F.

In general, the above described disclosure discusses NCAP management in terms of a server system within client-server architecture. This server system is described generally as a single server; however, more than one server is contemplated in this disclosure. Indeed, in accordance with certain embodiments, NCAP management can be applied broadly to a plurality of servers operating within a datacenter. In this manner, the overall computational and power efficiency of the various servers within the datacenter is improved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A server system within a client-server architecture, the server system comprising:
   a memory for storing data from one or more network packets;
   one or more processors for processing network requests based on the one or more network packets; and
   a network interface controller configured to receive the one or more network packets and transfer the data from the one or more network packets to the memory, the network interface controller comprising:
      a request monitor counter; and
      one or more registers storing payload template data, wherein the payload template data is a template of payload data of a network packet that is indicative of latency-critical request type data,
   wherein the network interface controller performs power management during a latency period for the network interface controller to transfer the data from the one or more network packets to the memory, and
   wherein the power management performed during the latency period is based on a comparison of payload data of the one or more network packets against the payload template data.

2. The server system of claim 1, wherein the power management performed by the network interface controller is a Network-drive, packet Context Aware Power (NCAP) management process comprising:
   examining the one or more network packets prior to the data from the one or more network packets being stored in the memory;
   detecting one or more latency-critical requests within the one or more network packets based on the examination of the one or more network packets;
   speculating a completion time for the one or more processors to complete the one or more latency critical requests;
   predicting an appropriate power state for the one or more processors based on the speculated completion time for the one or more latency critical requests; and
   transitioning a current power state of the one or more processors to the predicted appropriate power state.

3. The server system of claim 1, wherein latency-critical requests within the one or more network packets are detected by comparing the data from the one or more network packets against the payload template data and increasing a count of the request monitor counter when a latency-critical request is found.

4. The server system of claim 3, wherein the network interface controller further comprises a transmit counter configured to count an amount of data transmitted by the network interface controller.

5. The server system of claim 4, wherein:
   the network interface controller further comprises a Master Interrupt Throttling Timer (MITT), and
   when the MITT expires, the network interface controller compares the count of the request monitor counter against a Request rate High Threshold (RHT) and if the count is greater than or equal to the RHT an interrupt posts to the one or more processors to trigger a high power state.

6. The server system of claim 5, wherein the triggering the high power state of the one or more processors comprises:
   increasing an operational frequency of the one or more processors to a maximum frequency;
   disabling software determining low-power idle states of the one or more processors; and
   disabling software determining frequency states of the one or more processors for at least one invocation period.

7. The server system of claim 4, wherein:
   the network interface controller further comprises a Master Interrupt Throttling Timer (MITT), and
   when the MITT expires, the network interface controller compares the count of the request monitor counter against a Request rate Low Threshold (RLT) and compares a count of the transmit counter against a Transmission rate Low Threshold (TLT) and if the count of the request monitor counter is less than or equal to the RLT and the count of the transmit counter is less than or equal to the TLT, an interrupt posts to the one or more processors to trigger a lower power state.

8. A network interface controller of a server system within a client-server architecture, the network interface controller comprising:
   logic circuitry configured to receive one or more network packets and transfer data from the one or more network packets to a memory of the server system, the logic circuitry comprising:
      a request monitor counter; and
      one or more registers storing payload template data, wherein the payload template data is a template of payload data of a network packet that is indicative of latency-critical request type data,
   wherein the logic circuitry performs power management during a latency period during transfer of the data from the one or more network packets to the memory, and
   wherein the power management performed during the latency period is based on a comparison of payload data of the one or more network packets against the payload template data.

9. The network interface controller of claim 8, wherein latency-critical requests within the one or more network packets are detected by comparing the data from the one or more network packets against the payload template data and increasing a count of the request monitor counter when a latency-critical request is found.

10. The network interface controller of claim 9, wherein the logic circuitry further comprises a transmit counter configured to count an amount of data to transmit.

11. The network interface controller of claim 10, wherein the logic circuitry further comprises a Master Interrupt Throttling Timer (MITT), wherein when the MITT expires, the processor is configured to compare the count of the request monitor counter against a Request rate High Threshold (RHT) and if the count is greater than or equal to the RHT an interrupt posts to one or more processors of the server system to trigger a high power state.

12. The network interface controller of claim 11, wherein the interrupt triggering the high power state of the one or more processors comprises:
   increasing an operational frequency of the one or more processors to a maximum frequency;
   disabling software determining low-power idle states of the one or more processors; and
   disabling software determining frequency states of the one or more processors for at least one invocation period.

13. The network interface controller of claim 11, wherein the logic circuitry further comprises a Master Interrupt Throttling Timer (MITT), wherein when the MITT expires, the processor is configured to compare the count of the request monitor counter against a Request rate Low Threshold (RLT) and compare a count of the transmit counter against a Transmission rate Low Threshold (TLT) and if the count of the request monitor counter is less than or equal to the RLT and the count of the transmit counter is less than or equal to the TLT, an interrupt posts to one or more processors of the server system to trigger a lower power state.

14. The network interface controller of claim 8, wherein the power management performed by the logic circuitry is a Network-drive, packet Context Aware Power (NCAP) management process that configures the logic circuitry to:
   examine the one or more network packets prior to the data from the one or more network packets being stored in the memory;
   detect one or more latency-critical requests within the one or more network packets based on the examination of the one or more network packets;
   speculate a completion time for one or more processors of the server system to complete the one or more latency critical requests;
   predict an appropriate power state for the one or more processors based on the speculated completion time for the one or more latency critical requests; and
   transition a current power state of the one or more processors to the predicted appropriate power state.

15. A Network-driven, packet Context Aware Power (NCAP) management method for a server system within a client-server architecture, the method comprising:
   examining one or more network packets prior to data from the one or more network packets being stored in a memory of the server system;
   detecting one or more latency-critical requests within the one or more network packets based on the examination of the one or more network packets;
   speculating a completion time for one or more processors of the server system to complete the one or more latency critical requests;
   predicting an appropriate power state for the one or more processors based on the speculated completion time for the one or more latency critical requests; and
   transitioning a current power state of the one or more processors to the predicted appropriate power state,
   wherein the appropriate power state is either a high power state or a lower power state, and
   wherein transitioning the current power state of the one or more processors to the high power state comprises:
      increasing an operational frequency of the one or more processors to a maximum frequency;
      disabling software determining low-power idle states of the one or more processors; and
      disabling software determining frequency states of the one or more processors for at least one invocation period.

16. The method of claim 15, wherein transitioning the current power state of the one or more processors to the lower power state comprises incrementally decreasing an operational frequency of the one or more processors.

* * * * *